Patented Sept. 13, 1927.

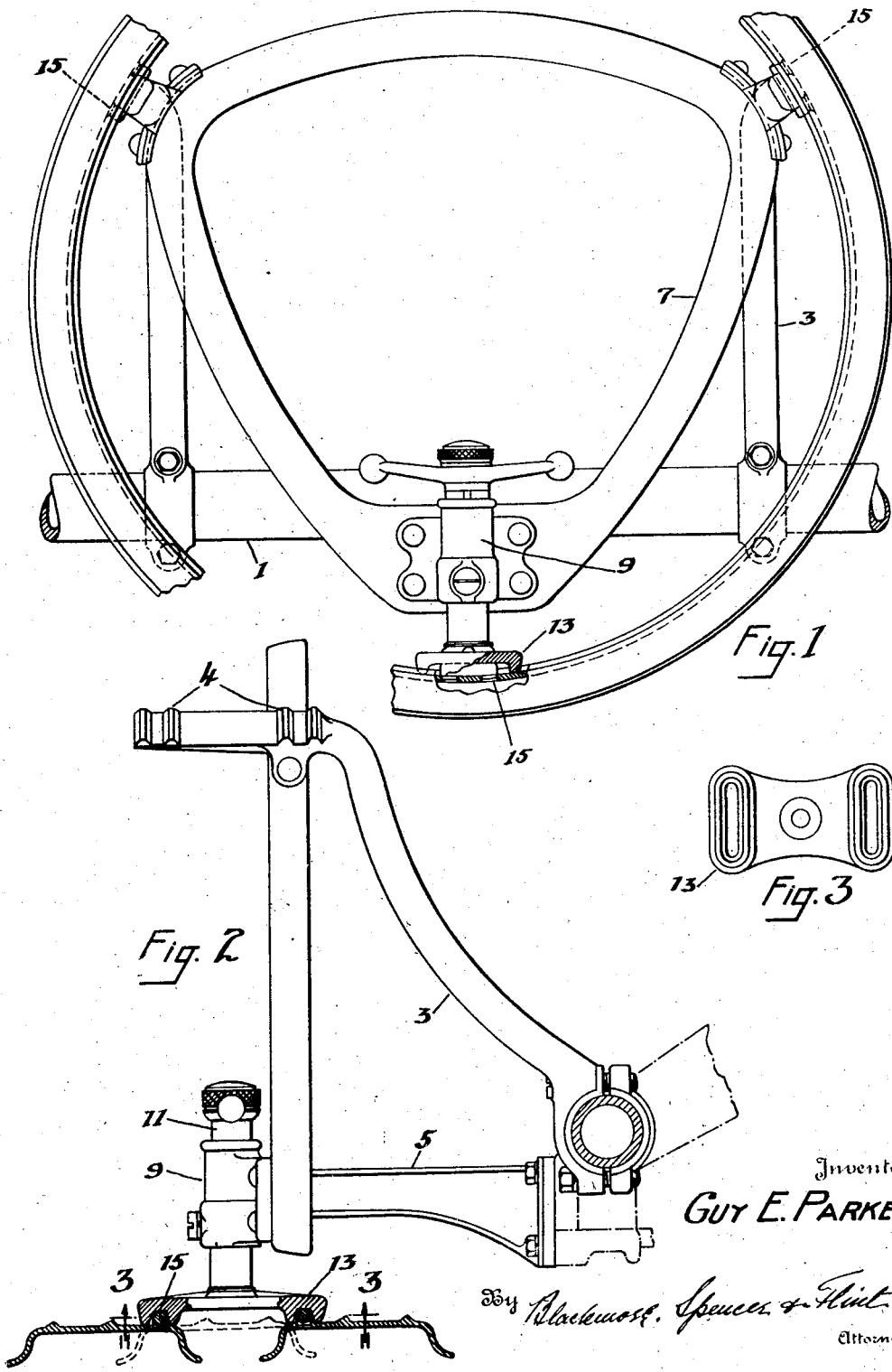

1,642,460

UNITED STATES PATENT OFFICE.

GUY E. PARKER, OF DETROIT, MICHIGAN, ASSIGNOR TO GENERAL MOTORS CORPORATION, OF DETROIT, MICHIGAN, A CORPORATION OF DELAWARE.

SPARE-TIRE CARRIER.

Application filed October 10, 1925. Serial No. 61,734.

This invention relates to spare tire carriers for vehicles. The invention has for its object to provide means on the vehicle cooperating with means on the tire carrying rim, which will make it possible to readily place a spare tire in position. It is the particular object of the invention to provide means to prevent the tire carrying rim from being rotated circumferentially and removed.

The invention consists in the inter-engagement of lugs on the rim with grooves on the carrier and the provision in such an arrangement of locking means to prevent circumferential rotation of the rim, which would release the lugs from the grooves and permit the removal of the tire and rim.

The invention will be best understood by reference to the accompanying drawing in which Figure 1 is a rear elevation of carrier and rim.

Figure 2, is a section on line 2—2 of Figure 1.

Figure 3, is a section on line 3—3 of Figure 2.

Referring to the drawings, reference character 1 represents a cross bar which is mounted in any convenient way upon the vehicle, preferably at its rear end. Clamped near the ends of bar 1, are upwardly and rearwardly extended arms 3. The end of each of these arms is provided with two grooves 4, one for an inwardly located rim and one for an outwardly located rim. Extending rearwardly from the central part of the cross bar 1, is a horizontally directed arm 5. To the outer end of this latter arm and to the upper ends of arms 3, is secured a generally triangularly shaped member 7. Fixed to the rear surface of this member 7 at about its lower apex, is a sleeve 9, carrying for vertical reciprocation, rod member 11, arranged to be secured in adjusted positions in the sleeve. The rod 11, carries at its lower end a double slotted plate member 13, best shown by Figure 3.

The carrier is intended for use with tire carrying rims having a plurality of inwardly directed lugs 15 located adjacent one side of the rim. These lugs, it will be seen may slide through the grooves of the arms. When the lugs are within the grooves the rim is held from removal, but, if turned sufficiently to disengage the lugs from the grooves the rim may be removed. To prevent such disengagement by circumferential turning, either as a result of accident or by malicious intent, locking means is obtained by the engagement of lugs in the slots of plate 13. The lugs are in such position that when the upper lugs are within the grooves the lower lug lies opposite the slot of the slotted plate. If now the rod member is reciprocated sufficiently to engage the lower lug in the slot, the rim is held by the two grooves and the single slot and cannot be turned because the lower lug would engage one of the end walls of the slot.

When two tires are carried, the rims are arranged with their sides carrying the lugs facing each other, as in Figure 2. If a single spare tire is being carried, a preferred arrangement is obtained by placing the rim so that its flat face extends across the carrier instead of away from the carrier. See dotted lines in Figure 2 the lugs engaging one set of grooves and the slot, as will be understood. By the arrangement described a very simple and effective means is provided for holding one or two spare tires. It is easily clamped in position and when so secured it cannot be released by a turning movement of the rim.

What I claim and desire to protect by Letters Patent is:

1. Spare tire carrying means for vehicles comprising a rim having inwardly and radially projecting lugs and a carrier having a plurality of cooperating grooves, one of which is closed at its ends to form a slot to thereby prevent a circumferential turning of the rim.

2. Means for carrying a spare tire comprising a rim, radial lugs on the rim, a fixed frame having grooves through which the lugs may slide and a radially reciprocating member carrying a slotted plate the slot having end walls to engage one of said lugs and thereby prevent circumferential movement of said rim.

3. Spare tire carrying means comprising a rim having a plurality of inwardly and radially projecting lugs, a cross bar for attachment to the vehicle, upwardly and rearwardly directed arms carried by the cross bar, a substantially triangular frame carried by the cross bar and arms, the upper ends of the arms having grooves to engage the rim lugs, the lower part of the triangular member having vertically reciprocating rod equipped at its lower end with a slotted plate, the slot of the plate having end walls to engage a lug of the rim and prevent circumferential turning.

4. Spare tire carrying means comprising a rim having a ring portion and a marginal flange, the ring portion having circumferentially spaced radial lugs adjacent one side, a frame member having circumferentially spaced holding means, one of said holding means having slots spaced axially to an extent commensurate with the width of said ring, whereby the rim may be secured in one or two positions, either projecting away from the holding means to accommodate a second rim or lying flat against the holding means, the same lug and slot cooperating to prevent circumferential movement of the rim in each of said positions of the rim.

5. Spare tire carrying means comprising a rim, a carrier therefor, the rim and the carrier having radially, inter-engaging parts whereby the rim is held from removal from the carrier, one of said parts consisting of a lug and a slot, the slot having end walls engaged by the lug whereby circumferential movement of the rim about the carrier is prevented.

6. Spare tire carrying means comprising a rim, a carrier therefor, the rim and the carrier having a plurality of pairs of radially, inter-engaging parts whereby the rim is held from removal from the carrier, one of said pairs of inter-engaging parts comprising members in end-wise engagement to prevent relative circumferential movements of the carrier and rim.

In testimony whereof I affix my signature.

GUY E. PARKER.